Aug. 25, 1959  A. J. SLEMMONS  2,901,214
TURBINE WHEEL AND SHAFT ASSEMBLY
Filed April 12, 1954  2 Sheets-Sheet 1
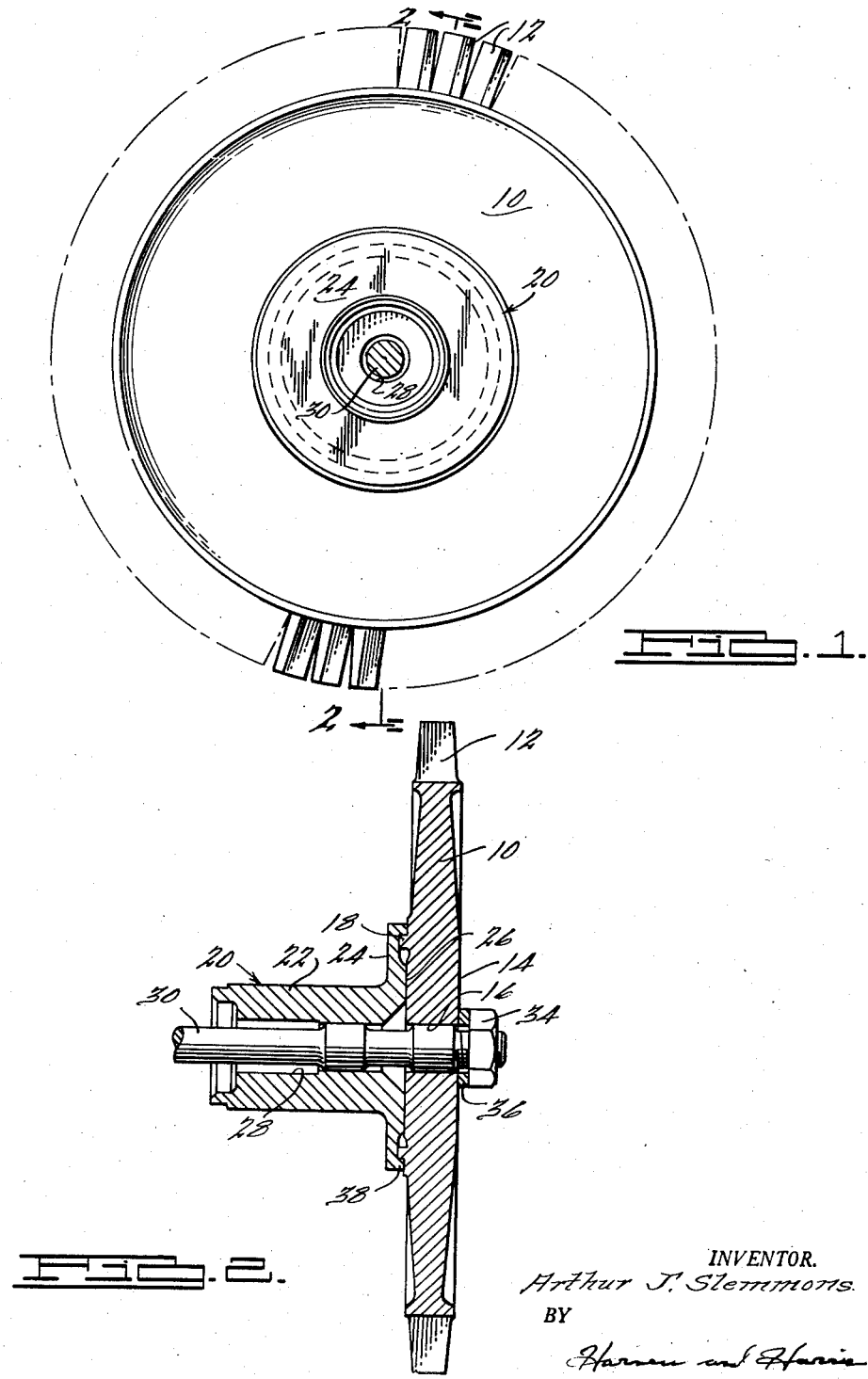
INVENTOR.
Arthur J. Slemmons
BY
Harness and Harris
ATTORNEYS Aug. 25, 1959  A. J. SLEMMONS  2,901,214
TURBINE WHEEL AND SHAFT ASSEMBLY
Filed April 12, 1954  2 Sheets-Sheet 2
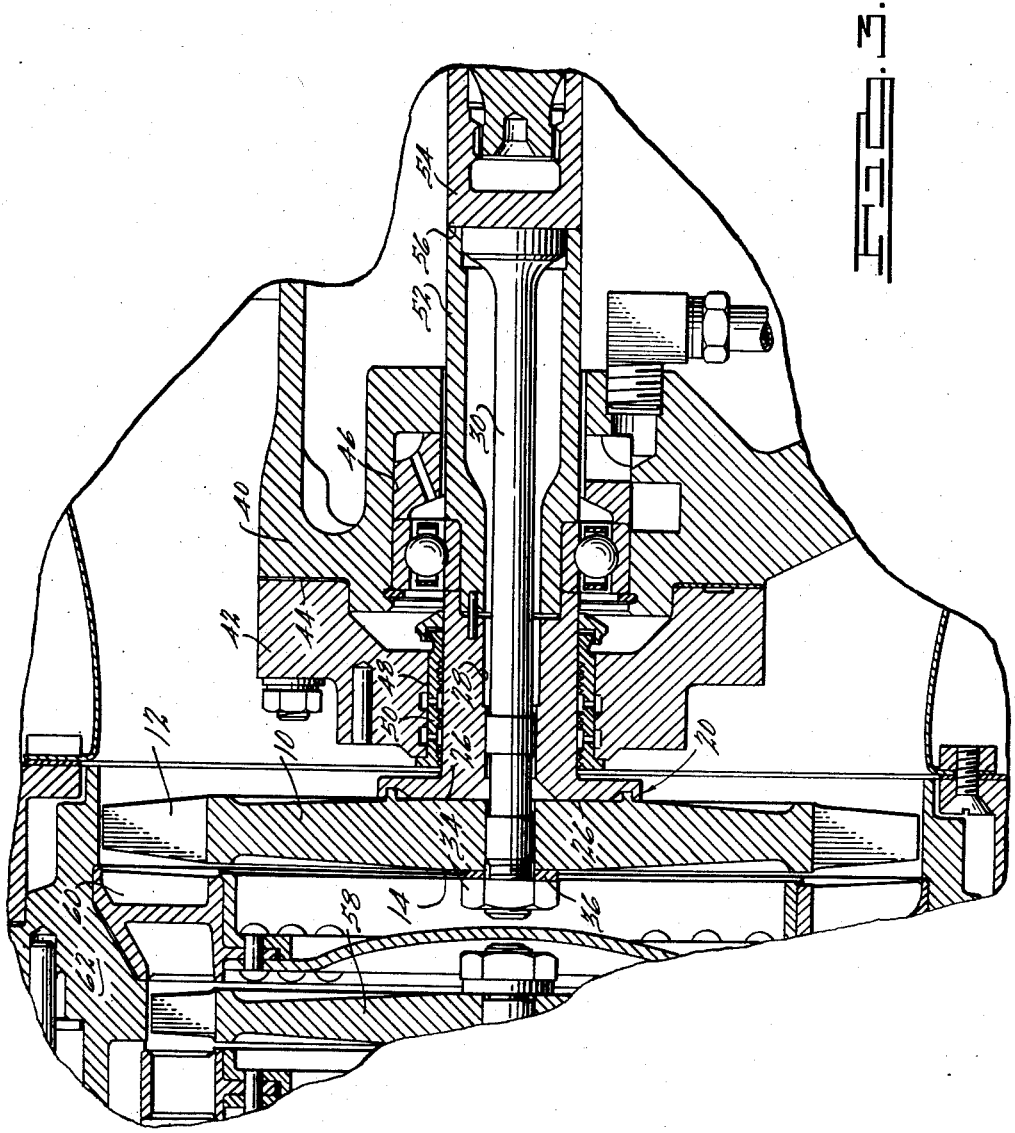
INVENTOR.
Arthur J. Slemmons
BY
Harness and Harris
ATTORNEYS United States Patent Office 2,901,214
Patented Aug. 25, 1959

2,901,214

TURBINE WHEEL AND SHAFT ASSEMBLY

Arthur J. Slemmons, Birmingham, Mich.

Application April 12, 1954, Serial No. 422,400

2 Claims. (Cl. 253—39)

This invention relates generally to gas turbine power plants and more particularly to a new and advantageous means for securing a rotary turbine wheel to a turbine shaft.

Gas turbine power plants are commonly provided with a turbine wheel assembly comprising a turbine wheel disc and a plurality of turbine blades fixed about the periphery of the disc. The turbine disc may be secured to a coaxially disposed turbine shaft and means may be provided for rotatably mounting the shaft within a portion of the power plant housing. The turbine shaft may be drivably connected to a suitable power absorbing means through a power transmitting mechanism. A burner assembly may be provided for producing motive gases and suitable conduit means or baffle structure may be provided for conducting the motive gases through the blades of the turbine wheel assembly, these blades being effective to utilize the kinetic energy of the gases to produce a driving torque on the turbine shaft. A compressor unit is also commonly provided for compressing the intake air before it enters the burner to support combustion of the fuel. The rotor member for this compressor may be powered by means of an auxiliary turbine wheel which is also adapted to be driven by the motive gases.

The speeds obtained by the turbine wheels of such a power plant are normally of such a value that the dynamic stresses produced in the wheel disc are equal to or exceed the yield point of the material of which they are formed. Further, the speeds are such that dynamic balancing of the assembly becomes critical.

One means which is commonly employed in the gas turbine art for securing a turbine wheel disc to a rotatably mounted turbine shaft includes a suitable flange or shoulder secured to the shaft, the turbine wheel disc being secured to the shoulder by means of a plurality of bolts or dowels located about the center of the disc. Another means for securing a turbine wheel to a turbine shaft comprises a bolt or shaft received through a central aperture in the disc for drivably securing the disc hub against an end shoulder on the shaft. Engageable dogs or the like may be formed, if desired, on the disc hub and end shoulder respectively for providing a driving connection therebetween.

It has been observed that the presence of apertures or dogs in the turbine wheel discs as required by certain of the turbine wheel mounting means of the prior art creates a serious stress concentration problem. The stress distribution along a diametral section for such a rotating turbine wheel is such that the magnitude of the total combined stress at any given point along a radial line varies non-linearly with the radial distance of the point from the center of the wheel, the maximum stress occurring at the center portion of the disc. Since the apertures or dogs in the turbine wheel discs are located in the region of high stress, the stress concentration problem is accordingly magnified. Further, as a result of the non-linear stress distribution above mentioned, plastic deformation may readily occur at the radially inward portion of the disc during high speed operation of the turbine wheel while the radially outward portion of the disc yields elastically. This deformation gives rise to an eccentricity in the turbine wheel assemblies of the prior art which causes an unbalance that creates serious stress and vibration problems during high speed operation.

Accordingly, it is an object of the present invention to provide a new and improved means for mounting a turbine wheel disc upon a centrally disposed turbine shaft which will eliminate regions of stress concentration of the type described above.

Another object of the invention is to provide a turbine wheel assembly as set forth in the preceding object which includes a means for maintaining concentricity between the turbine wheel shaft and the turbine wheel disc thus eliminating an undesirable unbalance of the assembly.

Another object of the present invention is to provide a turbine wheel assembly comprising a turbine wheel disc, the turbine shaft having an end shoulder, means disposed at a radially outward location for piloting the shaft and disc to maintain concentricity therebetween, and fastening means for securing the disc hub against the shaft end shoulder.

For a particular description of one preferred embodiment of the invention, reference will be made to the accompanying drawings wherein:

Figure 1 is a side plan view of the turbine wheel assembly of the instant invention;

Figure 2 is a cross sectional view taken along the section line 2—2 of Figure 1; and Figure 3 is an assembly view of a portion of a gas turbine power plant with which the turbine wheel assembly of the instant invention may be employed.

As best seen in Figure 1, the turbine wheel includes a circular disc portion 10 having a plurality of blades 12 disposed about the outer periphery thereof. The blades 12 may be formed in a known manner to provide the optimum blade characteristics for recovering the kinetic energy of the motive combustion gases. The disc 10 is provided with a radially inward hub portion 14 having a central aperture therein, as shown at 16 in Figure 2.

The disc portion 10, as seen in Figure 2, includes a radially outward portion having an axial thickness which is somewhat less than that of the hub portion 14 thereof. A circular rim or pilot shoulder is formed, as shown at 18, on one side of the disc portion 10 and is concentrically situated with respect to the axis of the disc. The pilot shoulder 18 is located radially outward from the vicinity of the hub portion 14.

A shaft element or spacer is shown generally at 20, and it includes a substantially cylindrical portion 22 and a radially extending pilot flange 24 formed at one axial end thereof. The cylindrical portion 22 may be provided with a radially disposed end shoulder 26 and an axially extending central bore 28.

A bolt 30 may be received through the bore 28 and may be provided with a threaded end 32 for threadably receiving a nut 34. The nut 34 is effective to clamp the hub portion 14 of the turbine disc portion 10 into frictional engagement with the surface of the end shoulder 26 as shown. A suitable washer 36 may be provided, as shown, between the nut 34 and the hub 14.

The radial pilot flange 24 is provided with a peripheral pilot shoulder 38 having an inner peripheral piloting surface which is received over the mating outer piloting surface of the pilot shoulder 18 formed on the disc portion 10.

In the assembly view of Figure 3, a fixed housing portion of a gas turbine power plant embodying the present invention is shown at 40 and a plate 42 is secured to an axial face 44 thereof as shown.

The housing portion 40 and plate 42 are provided with aligned apertures 46 and 48, respectively, the aperture 48 being adapted to receive therethrough the cylindrical portion 22 of the shaft spacer 20. A suitable labyrinth seal 50 is retained within aperture 48 and provides sealing contact with the outer periphery of the cylindrical portion 22.

Another hollow shaft spacer may be provided, as shown at 52, in axial end-to-end abutting relationship with respect to the spacer 20 and is concentrically received within the aperture 46 in housing portion 40. The bolt 30 extends axially through spacer 52 and is integrally secured to another shaft member 54 which provides an end shoulder 56 for contacting the adjacent end of spacer 52. The member 54, spacer 52, spacer 20, and the turbine wheel disc may be held in axial stacked relationship by means of the bolt 30 and the clamping nut 34 to form a unitary assembly. The spacer 52 may be rotatably journalled in the housing portion 40 by a suitable bearing means within aperture 46. A second bearing support may be provided at the power output end of shaft member 54 in any suitable manner as desired.

The assembly view of Figure 3 further includes another turbine wheel 58 which is drivably connected to the compressor rotor. The motive gases are adapted to pass from left to right, as viewed in Figure 3, for driving each turbine wheel assembly. A stationary row of stator blades 60 are fixed to a portion 62 of the power plant housing and is disposed between the adjacent bladed peripheral portion of the respective turbine wheels.

During rotation of the turbine wheel assembly under operating conditions, torque may be delivered from the turbine wheel disc 10 to the shaft spacer 20 through the friction drive provided by the engaging surfaces of the spacer 20 and the disc hub portion 14. The through bolt 30 is effective to apply an axial force for maintaining a driving engagement between the disc 10 and the spacer 20.

The shoulder 18 is located in the region of the disc 10 which yields elastically under operating conditions. Plastic deformation of the hub portion 14 due to the operating stresses may therefore occur without causing eccentricity between the axes of the spacer 20 and the disc 10, the shoulder and flange 24 being adapted to yield elastically and uniformly in a radial direction to maintain the axial alignment of the assembly.

It is contemplated that various forms of the invention may be made and that the invention may be used with other forms of turbine wheel discs without departing from the scope of the invention as defined by the following claims.

I claim:

1. In combination, a rotatable gas turbine wheel comprising a radially inner hub portion and an integral radially outer disc portion, peripheral blades carried by said outer portion, said blades and the outer periphery of said wheel being in a high temperature zone exposed to high temperature driving gases effective to react with said blades and rotate said wheel at high speed, said inner hub portion being in a comparatively cool temperature zone effective to maintain a steep temperature gradient between said inner hub portion and outer periphery, said outer portion being elastically deformed and said inner portion being plastically deformed by the combined thermal and centrifugal operating forces on said wheel at said high speed and temperature, said outer portion having an integral coaxial annular pilot shoulder projecting axially from a side thereof, a hub member separable from said wheel, said hub member frictionally engaging said wheel and extending axially therefrom to comprise an axial hub extension, clamping means comprising the sole means effecting driving engagement between said hub member and wheel, said clamping means extending coaxially through at least portions of said hub member and wheel and engaging and clamping the same together, said hub member having a rigid load sustaining radial extension having in turn an annular pilot shoulder sleeved over the first-named shoulder in coaxial supporting engagement therewith, said hub member and radial extension being independent of direct contact with said thermal and centrifugal forces except as transmitted thereto by said first-named shoulder, said shoulders tightly interfitting at all times and comprising rigid means for transmitting said operating forces to said load sustaining radial extension to preserve the concentricity of said plastically deformed inner portion when said wheel is subject to said forces.

2. The combination as in claim 1 and in addition said clamping means comprising a shaft separable from said wheel and hub member and extending coaxially therethrough and terminating in an enlarged integral axial extension to provide an abutment shoulder confronting one side of said wheel, a spacer extending coaxially around said shaft between and in abutting relationship with said abutment shoulder and said axial hub extension of said hub member, means on said shaft frictionally engaging said wheel at the side thereof opposite said one side and cooperating with said abutment shoulder to clamp said wheel, hub member, and spacer together in axially stacked relationship.

References Cited in the file of this patent

UNITED STATES PATENTS

| | | |
|---|---|---|
| 1,873,956 | Dahlstrand | Aug. 30, 1932 |
| 1,959,220 | Robinson | May 15, 1934 |
| 2,418,967 | Clark | Apr. 15, 1947 |
| 2,441,432 | McGee | May 11, 1948 |
| 2,577,134 | Land | Dec. 4, 1951 |
| 2,610,786 | Howard | Sept. 16, 1952 |
| 2,628,766 | Rydmark | Feb. 17, 1953 |
| 2,643,851 | McMahan | June 30, 1953 |
| 2,757,857 | Savin | Aug. 7, 1956 |

FOREIGN PATENTS

| | | |
|---|---|---|
| 71,372 | Sweden | Mar. 10, 1931 |
| 284,189 | Switzerland | Nov. 1, 1952 |

OTHER REFERENCES

Ser. No. 385,333, Schutte (A.P.C.), published May 25, 1943.